US008474055B2

(12) United States Patent
Seo et al.

(10) Patent No.: US 8,474,055 B2
(45) Date of Patent: Jun. 25, 2013

(54) METHOD AND APPARATUS FOR MANAGING DIGITAL CONTENT

(75) Inventors: Ju-hee Seo, Seoul (KR); Myung-sun Kim, Uiwang-si (KR); Hak-soo Ju, Suwon-si (KR); Ji-young Moon, Suwon-si (KR); Mi-hwa Park, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 759 days.

(21) Appl. No.: 12/014,486

(22) Filed: Jan. 15, 2008

(65) Prior Publication Data

US 2008/0201782 A1    Aug. 21, 2008

(30) Foreign Application Priority Data

Jan. 15, 2007 (KR) .................. 10-2007-0004400

(51) Int. Cl.
H04L 29/06 (2006.01)
(52) U.S. Cl.
USPC ........................................... 726/27; 380/200
(58) Field of Classification Search
USPC ..................... 380/201–204; 726/27
See application file for complete search history.

(56) References Cited

U.S. PATENT DOCUMENTS

| 6,567,107 | B1* | 5/2003 | Stannard ........................ 715/764 |
| 6,920,567 | B1* | 7/2005 | Doherty et al. .................. 726/22 |
| 7,088,823 | B2* | 8/2006 | Fetkovich ..................... 380/255 |
| 2003/0131251 | A1 | 7/2003 | Fetkovich |
| 2006/0026105 | A1* | 2/2006 | Endoh .............................. 705/59 |
| 2006/0242074 | A1* | 10/2006 | Kokkinen ....................... 705/53 |

FOREIGN PATENT DOCUMENTS

| CN | 1613255 A | 5/2005 |
| JP | 1-166218 A | 6/1989 |
| JP | 2003-186558 A | 7/2003 |
| WO | 03/061287 A1 | 7/2003 |

OTHER PUBLICATIONS

Office Action issued Aug. 24, 2011 from the State Intellectual Property Office of P.R. China in counterpart Chinese application No. 200810009584.3.
Communication dated May 8, 2012 issued by the Japanese Patent Office in corresponding Japanese Application No. 2008-004655.
Communication dated Apr. 20, 2012 issued by the State Intellectual Property Office of the People's Republic of China in corresponding Chinese Application No. 200810009584.3.
Communication issued on Jan. 4, 2012 by the Japanese Patent Office in the counterpart Japanese Patent Application No. 2008-004655.
Communication dated Nov. 13, 2012, issued by the State Intellectual Property Office for the People's Republic of China in counterpart Chinese Patent Application No. 2008100095843.

* cited by examiner

*Primary Examiner* — Edan Orgad
*Assistant Examiner* — Brian Olion
(74) *Attorney, Agent, or Firm* — Sughrue Mion, PLLC

(57) ABSTRACT

A method and apparatus for managing digital content are provided. The apparatus for managing digital content generated by applying digital rights management (DRM) includes: a content execution unit executing digital content; and a control unit confirming whether or not digital content is in a first period in which the digital content can be normally executed, and controlling the content execution unit so that, if the digital content is in the first period, the digital content can be executed normally, and if the digital content is in a second period which is not in the first period, the digital content can be executed in a manner which can be distinguished from that of execution in the first period. According to the apparatus and method, execution of digital content, which is close to expiration, can be controlled, thereby managing the expiration of the digital content for a user.

16 Claims, 3 Drawing Sheets

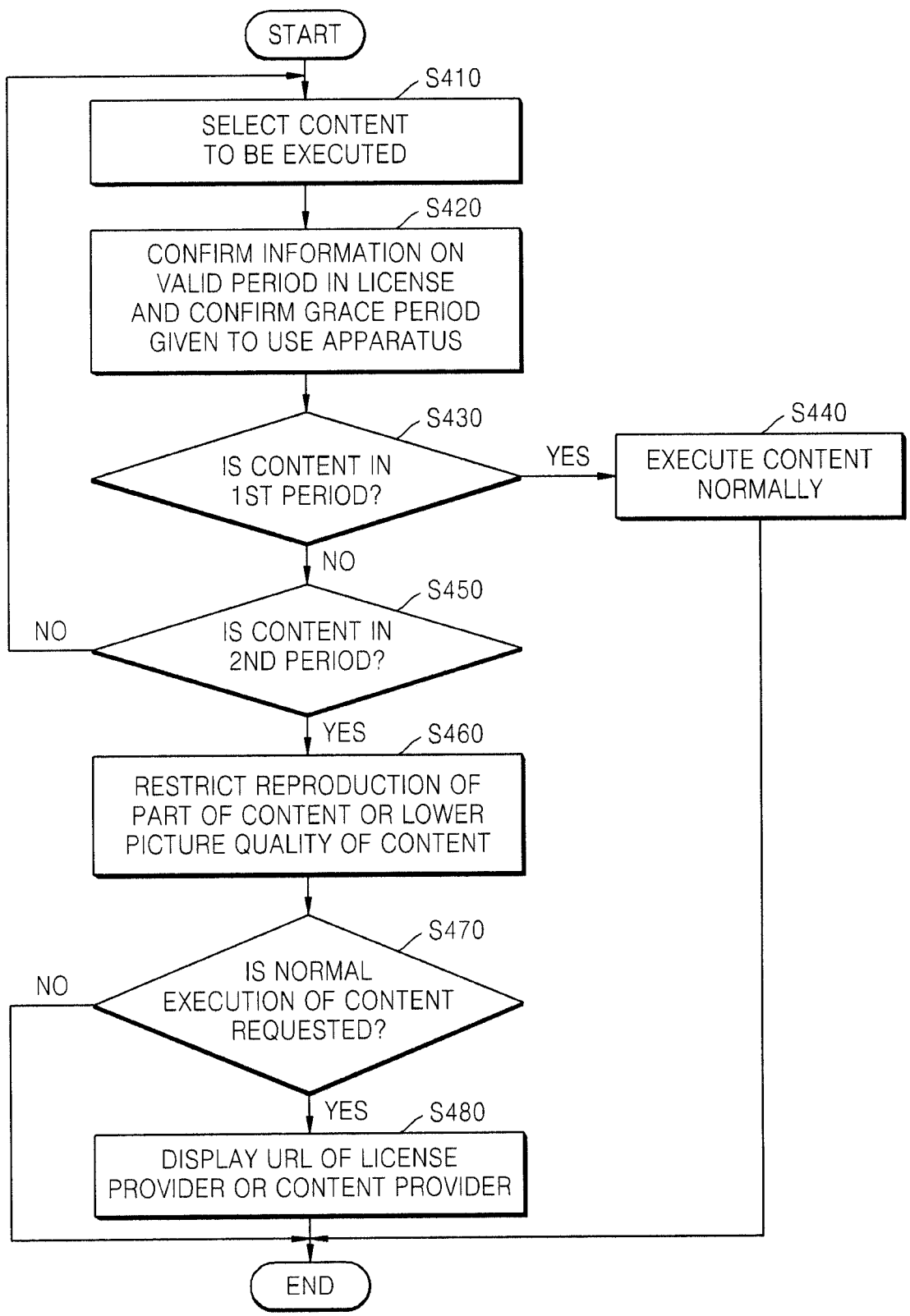

METHOD AND APPARATUS FOR MANAGING DIGITAL CONTENT

CROSS-REFERENCE TO RELATED PATENT APPLICATIONS

This application claims the benefit of Korean Patent Application No. 10-2007-0004400, filed on Jan. 15, 2007, in the Korean Intellectual Property Office, the disclosure of which is incorporated herein in its entirety by reference.

BACKGROUND OF THE INVENTION

1. Field of the Invention

The present invention relates to a method and apparatus for managing digital content, and more particularly, to a method and apparatus for managing digital rights management (DRM) content for which a usage period is predetermined.

2. Description of the Related Art

Digital content has a characteristic in that it can be copied without loss unlike analog data, and it can be easily copied, reused, processed, and distributed. However, since authoring of the digital content requires much cost and time, illegal copying and distribution of digital content causes problems. In order to protect digital content and content authors from illegal copying, research on digital rights management (DRM) has been actively carried out, and many services using DRM have been introduced.

DRM is a technology that safely protects the rights and profits of content providers, prevents illegal copying, and supports the generation of digital content and management of distribution, including billing and payment agency services. According to conventional technology, a license includes a usage condition for a machine or person to read, and in order to prevent modification of the condition, an electronic signature is added and then, transmitted. The usage condition includes a valid period, the number of times reproduction is allowed, a maximum continuous reproduction time, a total reproduction time, reproduction quality, etc.

If a user obtains a license in order to access digital content, a DRM system examines a usage condition specified in the license, and if the usage condition is satisfied, the DRM system executes the digital content requested by the user. If the condition of a valid period in the usage condition is not satisfied, for example, if the valid period expires, the digital content stored and used in the user terminal apparatus may be deleted or processed in another way, and thus the user cannot use the digital content any more.

SUMMARY OF THE INVENTION

The present invention provides a method and apparatus for managing digital content in which execution of digital content which is close to expiration is controlled, thereby allowing a user to efficiently manage the digital content and inducing the user to reuse the digital content.

The present invention also provides a computer readable recording medium having embodied thereon a computer program for executing a method of managing digital content in which execution of digital content which is close to expiration is controlled, thereby allowing a user to efficiently manage the digital content and inducing the user to reuse the digital content.

According to an aspect of the present invention, there is provided a method of managing digital content generated by applying digital rights management (DRM), the method including: confirming whether or not the digital content is in a first period in which the digital content can be normally executed, in other words, whether or not the current time is within a first period specified in relation to the digital content; and if the digital content is in the first period, normally executing the digital content, and if the digital content is in a second period which is not in the first period, in other words, the current time is in a second period which is not in the first period specified in relation to the digital content, executing the digital content in a manner which can be distinguished from that of the execution in the first period.

According to another aspect of the present invention, there is provided an apparatus for managing digital content generated by applying DRM, the apparatus including: a content execution unit executing digital content; and a control unit confirming whether or not digital content is in a first period in which the digital content can be normally executed, and controlling the content execution unit so that, if the digital content is in the first period, the digital content can be executed normally, and, if the digital content is in a second period which is not in the first period, the digital content can be executed in a manner which can be distinguished from that of the execution in the first period.

According to still another aspect of the present invention, there is provided a computer readable recording medium having embodied thereon a computer program for executing a method of managing digital content generated by applying DRM.

BRIEF DESCRIPTION OF THE DRAWINGS

The above and other features of the present invention will become more apparent by describing in detail exemplary embodiments thereof with reference to the attached drawings in which:

FIG. 4 is a flowchart illustrating a method of managing digital content according to another exemplary embodiment of the present invention.

DETAILED DESCRIPTION OF EXEMPLARY EMBODIMENTS

The present invention will now be described more fully with reference to the accompanying drawings, in which exemplary embodiments of the invention are shown.

Figure 1:
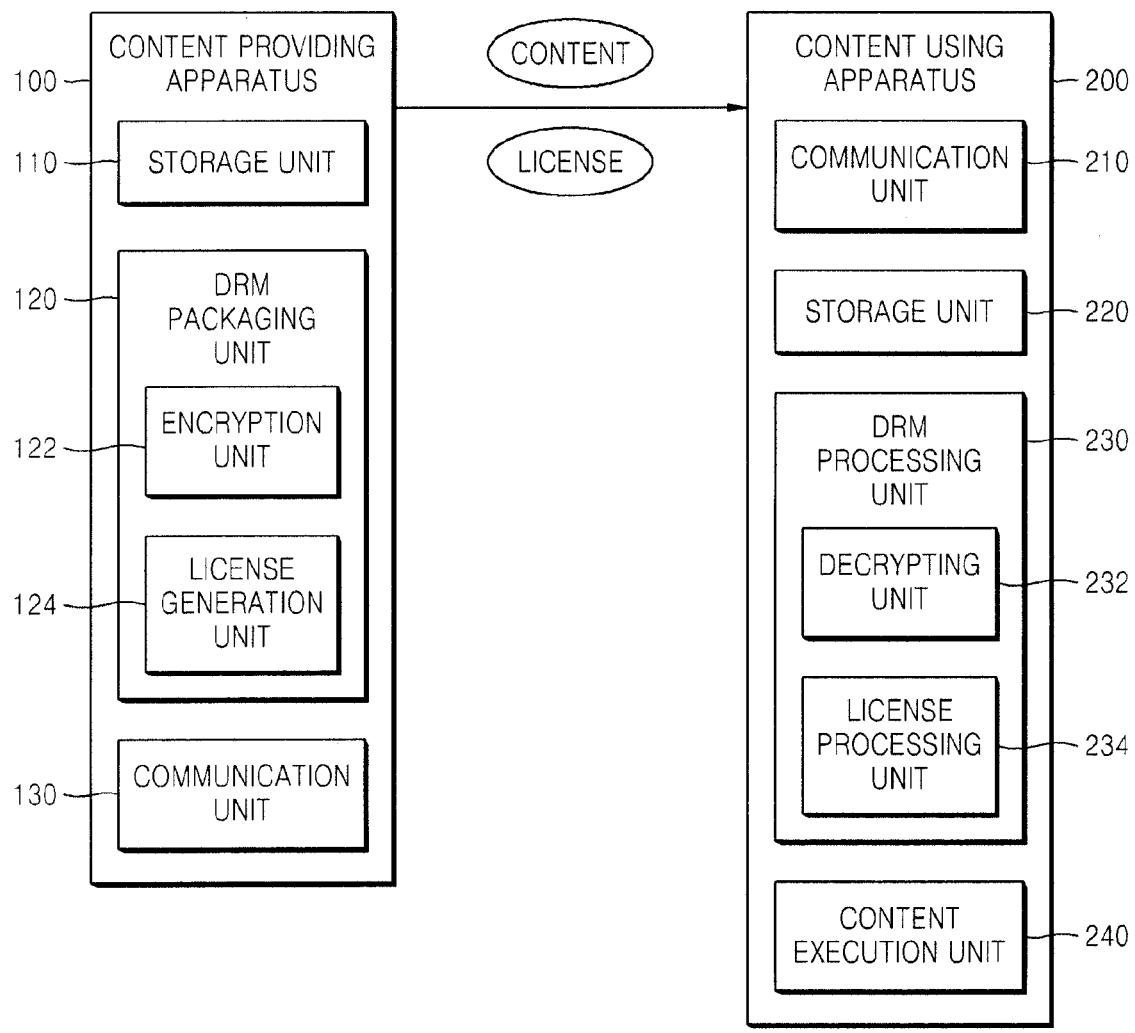
FIG. 1 is a diagram illustrating an apparatus for providing digital content and an apparatus for using digital content according to an exemplary embodiment of the present invention.

FIG. 1 is a diagram illustrating an apparatus for providing digital content and an apparatus for using digital content according to an exemplary embodiment of the present invention.

A digital content system illustrated in FIG. 1 includes an apparatus for providing digital content 100 and an apparatus for using digital content 200. The apparatus for providing digital content 100 comprises a storage unit 110, a digital rights management (DRM) packaging unit 120, and a communication unit 130.

The storage unit 110 stores digital content to which DRM is applied, and its usage condition. In the present specification, the digital content is DRM content and is not limited by its type.

The DRM packaging unit 120 performs DRM in relation to digital content. For this, the DRM packaging unit 120 includes an encryption unit 122, and a license generation unit 124. The encryption unit 122 encrypts digital content. The license generation unit 124 generates a license required for generating digital content.

The communication unit 130 transmits digital content and its license to the apparatus for using digital content 200 through a transmission path.

Meanwhile, the apparatus for using digital content 200 receives digital content transferred by the apparatus for providing digital content 100 and uses the digital content. Although it is illustrated in FIG. 1 that digital content and its license are provided by the apparatus for providing digital content 100, the digital content and its license may be received from different apparatuses, and the reception of the content and license may be performed through a variety of paths.

The apparatus for using digital content 200 comprises a communication unit 210, a storage unit 220, a DRM processing unit 230 and a content execution unit 240.

Digital content and its license received through the communication unit 210 are stored in the storage unit 220.

The DRM processing unit 230 includes a decrypting unit 232, and a license processing unit 234.

The decrypting unit 232 decrypts the encrypted digital content, and if a content key is encrypted, the decrypting unit 232 decrypts the content key. The license processing unit 234 manages a license, and confirms whether or not an operation that a user desires to be performed satisfies a usage condition included in the license.

If it is confirmed in the license processing unit that the operation that the user desires to be performed satisfies the usage condition included in the license, the content execution unit 240 executes the decrypted content.

Figure 2:
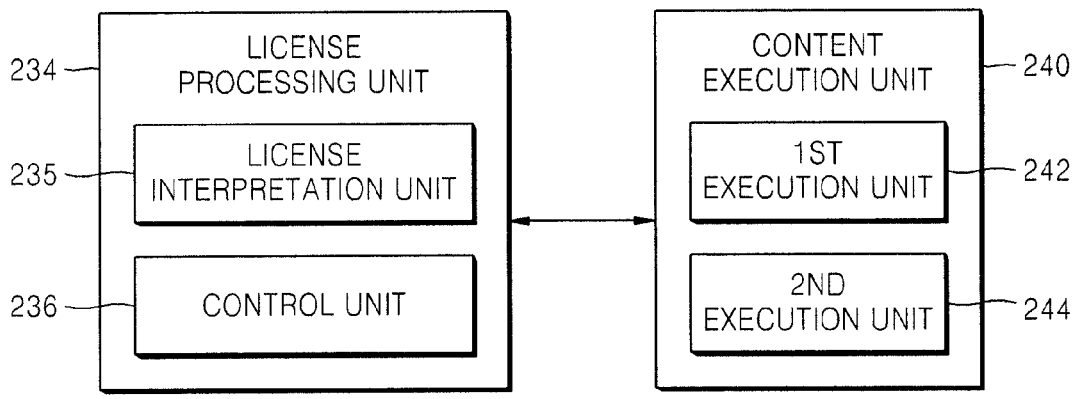
FIG. 2 is an apparatus for managing digital content that can be included in the apparatus for using digital content illustrated in FIG. 1 according to an exemplary embodiment of the present invention.

FIG. 2 is an apparatus for managing digital content that can be included in the apparatus for using digital content illustrated in FIG. 1 according to an exemplary embodiment of the present invention. The license processing unit 234 and the content execution unit 240 illustrated in FIG. 2 correspond to the apparatus for managing digital content according to an exemplary embodiment of the present invention.

The license processing unit 234 uses a license and thus performs authentication and authorization of a user in relation to digital content. The license processing unit 234 includes a license interpretation unit 235 and a control unit 236.

The license interpretation unit 235 interprets the content of a license. In particular, the license interpretation unit 235 interprets the contents of a valid period in the contents of the license. The valid period may include a condition period in which normal use of digital content is permitted. Also, in addition to the condition period, the valid period may further include a grace period in which even if the condition period expires, use of the digital content is permitted for a predetermined period.

According to conventional technology, while digital content is normally executed, if a valid period for the digital content expires, execution of the digital content is stopped. However, according to an exemplary embodiment of the present invention, in order to effectively inform a user that a period in which digital content can be used approaches expiration, a first period in which the digital content is normally executed, and a second period in which the digital content is executed in a manner which can be distinguished from that of the execution of the digital content in the first period are set.

A method of determining the first period and the second period may be stored in the apparatus for using digital content 200 in advance. Also, according to a user input signal, the setting of the first and second periods may be changed.

According to an exemplary embodiment of the present invention, when a valid period included in the contents of the license for digital content includes a condition period and a grace period, the control unit 236 may determine the condition period as the first period and the grace period as the second period.

According to another exemplary embodiment of the present invention, when a valid period included in the contents of the license for digital content includes a condition period and a grace period, the control unit 236 may determine the condition period and the grace period as the first period. The control unit 236 may assign a third period for permitting execution of the digital content for a limited period, and determine the assigned third period as the second period. If a right of assigning a predetermined grace period is given in advance by the apparatus for providing digital content 100, the apparatus for using digital content 200 may assign a predetermined grace period in this way.

According to another exemplary embodiment of the present invention, if a valid period included in the contents of a license for digital content is a condition period, the control unit 236 may determine the condition period as the first period. Also, the control unit 236 may assign a fourth period for permitting execution of the digital content for a limited period, and determine the assigned fourth period as the second period.

If a user input signal for the user to execute digital content by using a user interface (not shown) is received, the control unit 236 confirms which period the digital content is currently included in.

First, the control unit 236 confirms whether or not the digital content is in the first period in which the digital content can be normally executed. Then, if the digital content is in the first period, the control unit 236 controls the content execution unit 240 so that the digital content can be normally executed. Also, if the digital content is not in the first period but instead is in the second period, the control unit 236 controls the content execution unit 240 so that the digital content can be executed in a manner which can be distinguished from that of the execution in the first period.

According to an exemplary embodiment of the present invention, the content execution unit 240 may be formed by a first execution unit 242 normally executing digital content in the first period and a second execution unit 244 executing digital content in the second period. Accordingly, if the digital content to be executed is in the first period, the control unit 236 controls the content execution unit 240 so that the first execution unit 242 can operate and if the digital content to be executed is in the second period, the control unit 236 controls the content execution unit 240 so that the second execution unit 244 can operate.

In the second period, the second execution unit 244 may restrict reproduction of part of digital content, or lower picture quality of all or part of digital content when executing the digital content. In this case, the length of the part to be restricted in reproduction or the degree of lowering the picture quality may be adjusted to be in proportion to the remaining period before expiration.

Also, when reproduction of part of digital content is restricted, reproduction of the end part of the digital content may be restricted in a manner similar to that of modifying analog content as the time elapses. Also, when information on the number of times execution is performed is included in the usage condition of digital content, execution of the digital content may be restricted in proportion to the remaining allowed number.

Meanwhile, in order for a user who is using digital content in the second period, to efficiently manage the digital content, the control unit 236 may provide information required for managing the digital content during the second period. The information required for managing the digital content may be in a variety of forms, including a message indicating that a valid period of the digital content approaches expiration.

For example, the information required for managing the digital content may include at least one of an information item indicating an execution state of the digital content in a grace period and an information item required for reusing the digital content. The information item indicating the execution state of the digital content may include one of an information item indicating the position and size of a part that cannot be reproduced, and an information item indicating the degree to which the picture quality of the digital content is lowered.

Accordingly, when reproduction of part of the digital content is restricted, the user can receive information indicating the position and size of the part of the digital content that is not reproduced, together on a screen on which the digital content is executed. Also, when the picture quality of the digital content is lowered, the user can receive information indicating the degree to which the picture quality is lowered, together on the screen on which the digital content is executed.

In addition, if the digital content cannot be used any more, meta information related to the digital content may be unusable. Accordingly, if the second period begins, the control unit 236 may separately store information which is included in the meta information and is required for reusing the digital content, so that the information cannot be deleted or discarded. In this case, the information required for reusing the digital content may include at least one URL information of a DRM content author, a license provider of the DRM content, and a DRM content distributor. Also, predetermined information capable of obtaining a universal resource locator (URL), for example, an international standard book number (ISBN), may be stored in advance.

Meanwhile, if a user input signal requesting reuse of digital content is received, the control unit 236 accesses the apparatus for providing digital content 100, and transfers information on the position and size of the part of the digital content that cannot be executed to the apparatus for providing digital content 100, so that only the appropriate part of the digital content can be downloaded.

Figure 3:
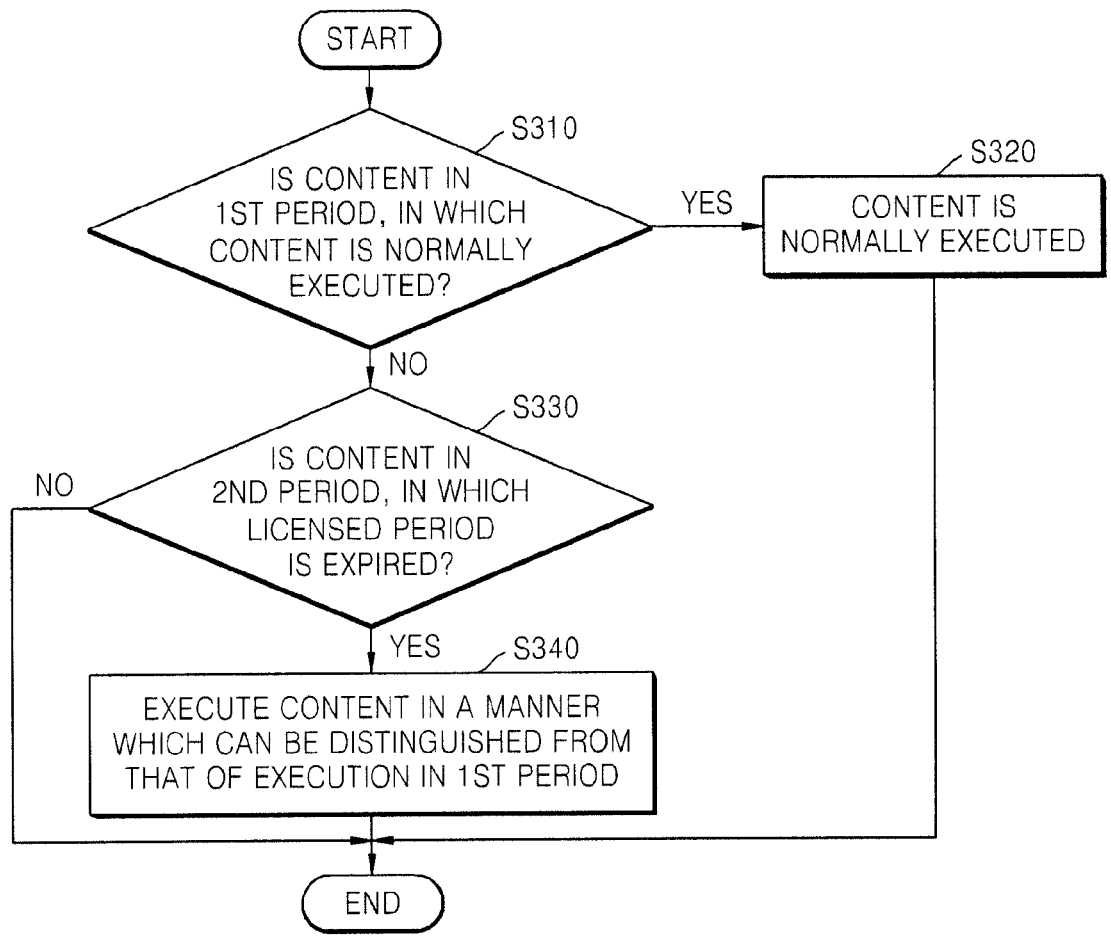
FIG. 3 is a flowchart illustrating a method of managing digital content according to an exemplary embodiment of the present invention.

FIG. 3 is a flowchart illustrating a method of managing digital content according to an exemplary embodiment of the present invention.

In operation S310, the control unit 236 confirms whether or not the digital content is in the first period in which the digital content can be normally executed.

If it is confirmed in operation S310 that the digital content is in the first period, the control unit 236 controls the content execution unit 240 so that the digital content can be normally executed in operation S320.

In operation S330, if the digital content is not in the first period but instead is in the second period, the control unit 236 controls the content execution unit 240 so that the digital content can be executed in a manner which can be distinguished from that of the execution in the first period in operation S340. Operation S340 may be performed by restricting reproduction of part of the digital content or by lowering the picture quality of all or part of the digital content.

According to an exemplary embodiment of the present invention, if a valid period included in the contents of a license for digital content includes a condition period and a grace period, the first period is the condition period and the second period is the grace period. Accordingly, during the condition period that is the first period, the content execution unit 240 normally executes the digital content according to a request from the user, and during the second period that is the grace period, the content execution unit 240 executes the digital content in a manner which can be distinguished from that of the execution in the first period.

According to another exemplary embodiment of the present invention, if a valid period includes a condition period and a grace period, the first period may be determined a period obtained by adding the condition period and the grace period. When the control unit 236 adds a third period that can be regarded as a second grace period in which execution of the digital content is permitted, in addition to the grace period included in the contents of the license, the third period assigned by the apparatus for providing digital content 100 can be determined as the second period. Accordingly, during the condition period and the grace period included in the contents of the license, the content execution unit 240 normally executes the digital content according to a request from the user, and during the grace period assigned by the apparatus for using digital content 200, the content execution unit 240 executes the digital content in a manner which can be distinguished from that of the execution in the first period.

According to another exemplary embodiment of the present invention, a valid period included in the contents of a license for digital content may include a condition period without a grace period. In this case, the control unit 236 in the apparatus for using digital content 200 may assign a fourth period in which execution of the digital content is permitted. The control unit 236 determines the condition period as the first period and the assigned fourth period as the second period. Accordingly, during the first period that is the condition period included in the contents of the license, the apparatus for using digital content 200 normally executes the digital content according to a request from the user, and during the second period that is the fourth period assigned by the apparatus for using digital content 200, the apparatus for using digital content 200 executes the digital content in a manner which can be distinguished from that of the execution in the first period.

In addition, in operation S340, information required for managing the digital content during the second period can be provided. The control unit 236 may provide information indicating the execution state of the digital content during a grace period, for example, information indicating the degree to which the picture quality is lowered, and may indicate the remaining time before expiration. Also, the control unit 236 may provide information required for reusing the digital content, for example, Uniform Resource Locator (URL) information required for accessing a server of a content provider or license provider.

Also, if the valid period of the digital contents expires in operation S330, meta information transferred together with the digital content may also be lost. Accordingly, information which is included in the meta information and is required for reusing the digital content may be separately stored. The information required for reusing the digital content may include at least one of URLs of a DRM content author, a license provider of the DRM content, and a DRM content distributor.

FIG. 4 is a flowchart illustrating a method of managing digital content according to another exemplary embodiment of the present invention.

In operation S410, digital content to be executed is selected based on a user input signal.

In operation S420, information on a valid period in the contents of a license is confirmed in the license interpretation unit 235, and the control unit 236 confirms whether or not a grace period exists in the apparatus for using digital content 200, and the length of the grace period.

In operation S430, if the control unit 236 determines that the current digital content is in the first period in which the digital content can be normally executed, the content execution unit 240 normally executes the digital content in operation S440.

In operation S450, if the control unit 236 confirms that the current digital content is in the second period for which it is necessary to indicate that the period for using the digital content approaches expiration, the content execution unit 240 restricts reproduction of part of the digital content, or lowers the picture quality of all or part of the digital content when executing the digital content in operation S460. In operation S460, information on the size and position of the part to be restricted in the reproduction of the digital content, or information indicating the execution state of the digital content showing the degree to which the picture quality of the digital content is lowered may be provided.

In operation S470, if a user input signal input by the user and requesting normal reproduction of the digital content is received, information on the URLs of a license provider issuing a license for the digital content or information on a content provider is displayed in operation S480. In this case, the information on the URLs may be provided as link information when the user selects a URL so that the user can access a server corresponding to the URL. If the user selects URL information, the control unit accesses a server corresponding to the selected URL, obtains a license issued again for the digital content or downloads the digital content so that the user can reuse the digital content.

In operation S480, instead of providing the URL information, information required for reusing the digital content may be provided or an operation required for the reuse of the digital content may be performed.

The present invention can also be embodied as computer readable codes on a computer readable recording medium or on a transmission medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

According to the present invention as described above, execution of DRM content for which a usage period is predetermined is controlled for a predetermined time before the usage period expires and thus the digital content cannot be used, and by the control, a user can be effectively informed about the approaching expiration.

In this way, the user can easily confirm a period in which the digital content can be used, thereby efficiently managing the digital content. Also, according to the present invention, in addition to information on the usage period, information required for reusing the digital content is provided, thereby inducing the user to reuse the digital content for which a period for normal execution has expired.

While the present invention has been particularly shown and described with reference to exemplary embodiments thereof, it will be understood by those of ordinary skill in the art that various changes in form and details may be made therein without departing from the spirit and scope of the present invention as defined by the following claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of managing digital content generated by applying digital rights management (DRM), the method comprising:
   confirming, in a client computer, whether or not the digital content is in a first period in which the digital content can be normally executed; and
   if the digital content is in the first period, normally executing the digital content in a first execution, and if the digital content is in a second period which is not in the first period, executing the digital content in a second execution, wherein the first and the second execution are different;
   wherein if a valid period included in contents of a license for the digital content includes a condition period and a grace period, the first period is the condition period and the second period is the grace period, and wherein execution of the digital content is prevented if the digital content is outside the valid period;
   wherein if the digital content is in the second period, providing a message indicating that the valid period approaches expiration;
   wherein the message comprises information regarding at least one of restricting reproduction of part of the digital content and lowering quality of all or part of the digital content, and
   wherein the information comprises at least one of an information item on a playback position and a size of the part of the digital content that is not reproduced, and an information item indicating a degree to which the quality of the digital content is lowered.

2. The method of claim 1, further comprising:
   if a valid period included in contents of a license for the digital content is a condition period, assigning an execution period for permitting execution of the digital content,
   wherein the first period is the condition period and the second period is the assigned execution period.

3. The method of claim 1, wherein the second execution comprises at least one of restricting reproduction of part of the digital content and lowering quality of all or part of the digital content.

4. The method of claim 1, wherein the message comprises at least one of an information item indicating an execution state of the digital content, and an information item required for reusing the digital content.

5. The method of claim 3, wherein the second execution further comprises separately storing information required for reusing the digital content.

6. The method of claim 5, wherein the information required for reusing the digital content comprises at least one of a universal resource locator (URL) of an author of the digital content, a URL of a license provider of the digital content, and a URL of a distributor of the digital content.

7. The method of claim 1, further comprising:
if a part of the digital content is not normally executed, accessing a content providing server and receiving the part of the digital content that is not normally executed.

8. An apparatus for managing digital content generated by applying DRM, the apparatus comprising:
a processor, the processor comprising:
a content execution unit which executes digital content; and
a control unit which confirms whether or not digital content is in a first period in which the digital content can be normally executed in a first execution, and controls the content execution unit so that, if the digital content is in the first period, the digital content can be executed normally, and, if the digital content is in a second period which is not in the first period, the digital content can be executed in a second execution, wherein the first and second executions are different;
wherein if a valid period included in contents of a license for the digital content includes a condition period and a grace period, the control unit determines the condition period as the first period and the grace period as the second period, and wherein execution of the digital content is prevented if the digital content is outside the valid period;
wherein if the digital content is in the second period, the control unit provides a message indicating that the valid period approaches expiration;
wherein the message comprises information regarding at least one of restricting reproduction of part of the digital content and lowering quality of all or part of the digital content, and
wherein the information comprises at least one of an information item on a playback position and a size of the part of the digital content that is not reproduced, and an information item indicating a degree to which the quality of the digital content is lowered.

9. The apparatus of claim 8, wherein if a valid period included in contents of a license for the digital content is a condition period, the control unit assigns an execution period for permitting execution of the digital content, and determines the condition period as the first period and the assigned execution period as the second period.

10. The apparatus of claim 8, wherein the control unit controls the content execution unit so that during the second period, reproduction of a part of the digital content is restricted or quality of all or part of the digital content is lowered.

11. The apparatus of claim 10, wherein the message comprises information required for managing the digital content during the second period.

12. The apparatus of claim 11, wherein the information required for managing the digital content includes at least one of an information item indicating an execution state of the digital content, and an information item required for reusing the digital content.

13. The apparatus of claim 8, wherein the control unit separately stores information required for reusing the digital content during the second period.

14. The apparatus of claim 13, wherein the information required for reusing the digital content comprises at least one of a URL of an author of the digital content, a universal resource locator (URL) of a license provider of the digital content, and a URL of a distributor of the digital content.

15. The apparatus of claim 8, further comprising a communication unit which controls access to a communication network,
wherein if a user input signal requesting reuse of digital content that is not normally executed is received, the control unit controls the communication unit so that a content providing server is accessed and the digital content that is not normally executed is received.

16. A non-transitory computer readable recording medium having embodied thereon a computer program for executing a method of managing digital content generated by applying DRM, the method comprising:
confirming whether or not the digital content is in a first period in which the digital content can be normally executed in a first execution; and
if the digital content is in the first period, normally executing the digital content, and if the digital content is in a second period which is not in the first period, executing the digital content in a second execution, wherein the first and the second executions are different;
wherein if a valid period included in contents of a license for the digital content includes a condition period and a grace period, the first period is the condition period and the second period is the grace period, and wherein execution of the digital content is prevented if the digital content is outside the valid period;
wherein if the digital content is in the second period, providing a message indicating that the valid period approaches expiration;
wherein the message comprises information regarding at least one of restricting reproduction of part of the digital content and said lowering quality of all or part of the digital content, and
wherein the information comprises at least one of an information item on a playback position and a size of the part of the digital content that is not reproduced, and an information item indicating a degree to which the quality of the digital content is lowered.

* * * * *